Nov. 6, 1951     D. WOLFSON ET AL     2,573,942

FLEXIBLE ANTIPICKING BLINDER FOR POULTRY

Filed Aug. 24, 1948

INVENTOR.
DAVID WOLFSON
HYMAN SEIDEN
BY
Stephen F. Cox.

ATTORNEY

Patented Nov. 6, 1951

2,573,942

UNITED STATES PATENT OFFICE 2,573,942

FLEXIBLE ANTIPICKING BLINDER FOR POULTRY

David Wolfson and Hyman Seiden, Far Rockaway, N. Y.

Application August 24, 1948, Serial No. 45,854

3 Claims. (Cl. 119—97)

This invention relates to blinders or masks to be applied to fowl for the usual purposes and is in the nature of an improvement in the subject matter of Patent No. 2,445,887, granted to us July 27, 1948.

Such blinders or masks are primarily placed on the beak of the fowls for the purpose of preventing them from picking one another and fighting, by intercepting the line of vision necessary to the performance of such acts, but without interfering with feeding or drinking. The loss or impairment of egg laying poultry due to these practices, particularly in flocks confined more or less closely in yards and coops and the need for preventive means are too well recognized and understood to require further explanation here.

Various devices for supplying this need have been provided, but all, so far as is known, are open to either the objection that they interfere to a considerable extent with the normal life and feeding habits of the fowl and sometimes cause serious injury or that they are injurious to the fowl due either to the method of their application or to their tendency to collect foreign matter with the consequent likelihood of infection and disease resulting in reduction of egg laying productivity and sometimes the loss of the fowl itself.

In the past it has been customary to provide a pair of metal disks similar to eyeglasses worn by humans, these disks being secured to the fowl by means of a metal strip passing through the nostril of the fowl and puncturing the membrane running through the middle of the beak.

The piercing of the membrane of the nasal passage increases the risk of injuring the membrane or the beak itself and causing considerable discomfort both when applied and afterward, due to the irritation and distortion of the membrane and the connected parts.

The close fit and rigidity of the nasal bridge and the blinders necessary to support the blinders and retain them in position tends to allow dirt, food and other foreign matter to collect between the connecting pieces and the beak of the fowl and in the nostrils and consequently provide a breeding place for infections as well as providing a starting place in which accumulated dirt and cakings may pile up and eventually obstruct the nasal passage of the fowl, all of which not only interferes with egg laying but affects the health of the bird.

It has also been found that wherever inflexible devices are used, such as metal disks and secure-ments, there is great risk of damage to the beak of the fowl due to catching portions of any more or less rigid structure on chicken wire enclosures or the blinder members of other fowls.

This invention is designed primarily to remedy these faults and to provide a mask device or blind of simple, strong and effective design which can be made at low cost, applied quickly and easily with one hand only and without injury to the fowl, and when so applied will serve the purpose intended without causing any material injury, annoyance or discomfort to the fowl, interfering with its normal living habits or exposing it or other fowls to the danger of accidental injury.

To this end we have provided a blinder which is light, highly flexible—preferably made of flexible material such as sheet rubber and stainless spring steel—and may be attached or removed quickly and easily and by the use of only one of the operator's hands, leaving the operator's other hand free to hold the fowl and its head. This makes the application and removal of the blinders a one-man task.

Other objects and advantages will be apparent to those familiar with the use of the device by the following specification and accompanying drawings referred to therein, in which—

Figure 1:
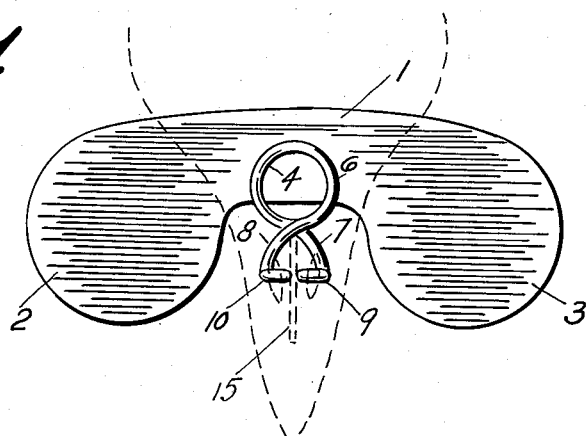
Fig. 1 is a plan of an exemplary embodiment of the improvements in position on the beak of a fowl, the beak being indicated in dotted line section.
Figure 2:
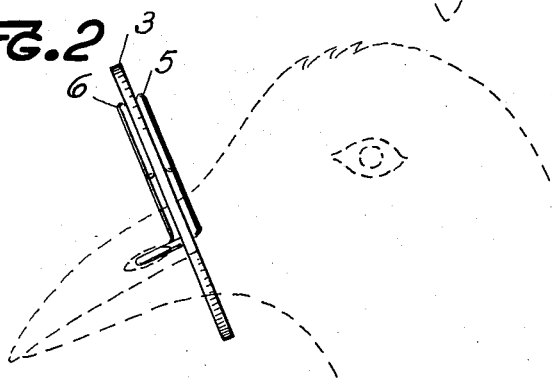
Fig. 2 is a side elevation of the same.
Figure 3:
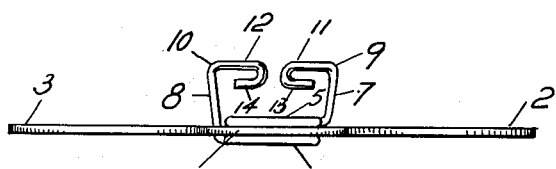
Fig. 3 is a substantial horizontal section.

In the said drawings, 1 is a blinder made of a single piece of highly resilient material such as rubber or rubberized fabric, or other impregnated sheet material. The blinder 1 extends outwardly and downwardly to form blinds 2 and 3. The central, narrowed portion 4 of the blinder 1 is adapted to be inserted and held tightly between the coils 5 and 6 of a wire spring whose downwardly extending and connecting portions 7 and 8 are inwardly bent at 9 and 10 to form connecting and supporting portions for the parts 1 to 8 inclusive. The inwardly bent portions of the springs 9 and 10 are again turned in on themselves at 11 and 12 to form blunt portions 13 and 14 which rest against the central nostril membrane 15 of the fowl and because of its bluntness will not pierce or cause abrasion of the said membrane.

Figure 4:
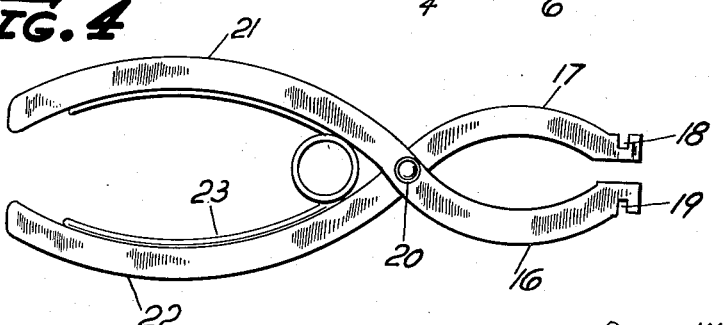
Fig. 4 is a side elevation of a pair of pliers for applying or removing the device.

The pliers shown in Fig. 4 are of special form and comprise curved jaws 16 and 17 terminating in notches 18 and 19. The jaws 16 and 17 are pivoted at 20 and at that point cross over and extend into apertured arms 21 and 22 which are normally held apart by means of the spring 23.

In operation the pincers are squeezed together by means of the movable handles 21 and 22 acting against the spring member 23, and this brings the arms 16, 17 together. One of the blinders assembled into the spring clip seat between 5 and 6 is picked up in the notches 18 and 19 of the pincers, so that the portions 7 and 8 near the bends 9 and 10 fit into the notches 18 and 19. Pressure is then released on the handles 21 and 22 and by the action of the spring 23 the arms 7 and 8 are forced apart thus widening the space between the blunt ends 13 and 14.

The blunt ends 13 and 14 are now allowed to slip into the nostril holes of the fowl's beak by means of increasing pressure on the handles 21 and 22, thus decreasing the distance between the ends 13 and 14. As the pressure is released on the arms 7 and 8 they automatically spring together until a point is reached where the ends 13 and 14 rest at opposite sides of the membrane 15 and by further squeezing the arms 21 and 22 the pincer tool may be removed from between the arms 7 and 8, leaving the blinders in proper position on the beak.

Among the uses and advantages of the improvements, are the following:

The blinders can be applied by one person, holding the chicken under one arm and its head with the hand of that arm, after placing the clip in the pliers, then if necessary spreading the pliers to spread the spring, inserting the turned-over ends in the nostril openings of the beak, then releasing the pliers and permitting the clip to spring into the nostrils and against the central membrane.

The coil of wire forming the clip and the blinder holder is of stainless spring steel and is so formed that it does not permit dirt, feeding mash or other food to accumulate and harden thereon.

The wire clip and coil are a single unit holding itself in the beak and also holding the two blinders and connecting portion in position. These are preferably made of sheet rubber or other flexible non-metallic material and may be punched out of flat sheets at very low cost. The wire unit also forms an almost rigid bridge piece for the "goggles."

The flexible non-metallic piece forming the blinds and connecting strip will not catch in wire fences, in the limbs of other fowls or in other objects, but will flex and release itself. There is also a slight flexibility in the metal unit, which will assist in preventing the blinders from catching in anything and causing injury, being of spring metal they constantly grip the connecting piece of the blinders and also the central membrane of the beak, to hold the entire device in proper position. At the same time the spring pressure can be so adjusted that the looped ends of the springs cause no irritation of the membrane.

The spring clip portion of the holder springs into position in the nostrils, with the blinders in proper position by its own resiliency, so that no pressure or manipulation is required in applying the device to the fowl. The blinders may be positioned either above or below the nostril openings, and in order to avoid the need for much pressure on the central membrane to prevent rocking motion of the holder on the beak it is best in most cases to apply the device so that the blinders are below the said opening and the portion of the holder below the merger of the parts 7 and 8 with the loops 5 and 6 resting on the outer part of the beak below the said opening.

What we claim is:

1. In a device of the character described, the combination of a spring gripping device comprising a spring loop and gripping arms extending therefrom and normally held in gripping position in the beak of a fowl by its own compressive action and said arms adapted to be expanded to a position away therefrom, a member comprising a pair of flexible blinders and a flexible connecting part between them, said connecting part being held tightly in the loop of said spring gripping device, the arms of said spring device adapted to be inserted in the nostril openings of a fowl's beak while said device is in expanded position and grip said beak inside said openings when in gripping position.

2. In a device of the character described, the combination of a partly coiled spring gripping device normally held in gripping position in the break of a fowl by its own compressive action and adapted to be expanded to a position away therefrom, a member comprising a pair of flexible blinders and a flexible connecting part between them, said connecting part being held tightly in the coils of said coiled spring part of the gripping device, inwardly turned portions of said coiled spring device adapted to be inserted in the nostril openings of a fowl's beak while said device is in expanded position, said inwardly turned portions adapted to grip said beak inside said openings when in gripping position.

3. In a device of the character described, the combination of a partly coiled spring gripping device normally held in gripping position by its own compressive action and adapted to be expanded to a position away therefrom, a member comprising a pair of flexible blinders and a connecting part between them, said connecting part being held securely in the coils of said coiled spring gripping device, angularly disposed integral and inwardly turned portions of said coiled spring device adapted to be inserted in the nostril openings of a fowl's beak while said device is in expanded position, said inwardly turned portions adapted to grip said beak inside said openings when in said gripping position and said coiled spring part adapted to hold said pair of flexible blinders and connecting part in position substantially normal to said beak.

DAVID WOLFSON.
HYMAN SEIDEN.

REFERENCES CITED

The following references are of record in the file of this patent:

UNITED STATES PATENTS

| Number | Name | Date |
|---|---|---|
| 187,061 | Snow | Feb. 6, 1877 |
| 680,975 | Hildreth | Aug. 20, 1901 |
| 2,079,107 | Cridlebaugh | May 4, 1937 |
| 2,445,867 | Wolfson et al. | July 27, 1948 |